United States Patent
Kirschman et al.

(10) Patent No.: US 12,553,628 B2
(45) Date of Patent: Feb. 17, 2026

(54) SURGICAL SMOKE TREATMENT SYSTEM FOR POLAR AND NONPOLAR GASES

(71) Applicants: David Louis Kirschman, Dayton, OH (US); Gregory Carroll, Springboro, OH (US)

(72) Inventors: David Louis Kirschman, Dayton, OH (US); Gregory Carroll, Springboro, OH (US)

(73) Assignee: Aerobiotix USA LLC, Miamisburg, OH (US)

( * ) Notice: Subject to any disclaimer, the term of this patent is extended or adjusted under 35 U.S.C. 154(b) by 358 days.

(21) Appl. No.: 18/184,758

(22) Filed: Mar. 16, 2023

(65) Prior Publication Data
US 2023/0296272 A1    Sep. 21, 2023

Related U.S. Application Data

(60) Provisional application No. 63/320,904, filed on Mar. 17, 2022.

(51) Int. Cl.
*B01D 53/04* (2006.01)
*A61L 9/16* (2006.01)
(Continued)

(52) U.S. Cl.
CPC ............... *F24F 8/95* (2021.01); *B01D 53/04* (2013.01); *F24F 8/158* (2021.01); *F24F 8/167* (2021.01)

(58) Field of Classification Search
CPC ... F24F 8/95; F24F 8/158; F24F 8/167; B01D 53/8668; B01D 53/261; B01D 53/885;
(Continued)

(56) References Cited

U.S. PATENT DOCUMENTS 3,732,669 A    5/1973 Chambers
3,804,942 A    4/1974 Kato et al.
(Continued)

FOREIGN PATENT DOCUMENTS

CN    205461795 U  *  8/2016
CN    207786184 U  *  8/2018
(Continued)

OTHER PUBLICATIONS

Machine-generated English translation of CN 205461795 U, published Aug. 17, 2016.*

(Continued)

*Primary Examiner* — Frank M Lawrence, Jr.
(74) *Attorney, Agent, or Firm* — Jacox, Meckstroth & Jenkins

(57) ABSTRACT

A surgical treatment system for contaminated air streams having particulate contamination, polar contamination and/or nonpolar contamination in the gas or vapor stream. A surgical smoke plume treatment system and method provide or define a multi-stage treatment process that mechanically filters the air stream, followed by nonpolar decontamination and then polar decontamination or treatment. The system may be used stand alone or incorporated and used with other surgical instruments or incorporated into an air handler adapted to decontaminate an air stream. A desiccant may optionally be used to remove water from the air stream.

58 Claims, 7 Drawing Sheets

(51) Int. Cl.
*F24F 8/158* (2021.01)
*F24F 8/167* (2021.01)
*F24F 8/95* (2021.01)

(58) Field of Classification Search
CPC ........ B01D 2251/402; B01D 2251/404; B01D 2251/60; B01D 2251/608; B01D 2253/102; B01D 2253/106; B01D 2253/25; B01D 2255/10; B01D 2255/1021; B01D 2255/1023; B01D 2255/1025; B01D 2255/1028; B01D 2255/20707; B01D 2255/20715; B01D 2255/2073; B01D 2255/20761; B01D 2257/70; B01D 2257/7027; B01D 2257/708; B01D 2257/80; B01D 2257/91; B01D 2258/02; B01D 2259/4146; B01D 2259/4533; B01D 2259/455; B01D 2259/80; B01D 2259/812; B01D 53/0415; A61B 18/00; A61B 18/12; A61B 18/18; A61B 2018/00595; A61B 2218/008
USPC .......... 95/141; 96/134, 147; 55/385.2, 386.1
See application file for complete search history.

(56) References Cited

U.S. PATENT DOCUMENTS

| | | | |
|---|---|---|---|
| 3,892,549 A | 7/1975 | Lyshkow | |
| 3,944,403 A | 3/1976 | Simpson et al. | |
| 4,064,876 A | 12/1977 | Mulchi | |
| 4,121,916 A | 10/1978 | Fricke | |
| 4,141,703 A | 2/1979 | Mulchi | |
| 4,236,902 A | 12/1980 | Fricke | |
| 4,534,775 A | 8/1985 | Frazier | |
| 4,604,110 A | 8/1986 | Frazier | |
| 4,619,672 A | 10/1986 | Robertson | |
| 4,810,269 A | 3/1989 | Stackhouse et al. | |
| 4,826,513 A | 5/1989 | Stackhouse et al. | |
| 4,963,134 A | 10/1990 | Backscheider et al. | |
| 4,986,839 A | 1/1991 | Wertz et al. | |
| 5,047,072 A | 9/1991 | Wertz et al. | |
| 5,108,474 A | 4/1992 | Riedy et al. | |
| 5,288,469 A | 2/1994 | Skalla | |
| 5,336,218 A | 8/1994 | Linhares | |
| 5,423,779 A | 6/1995 | Yeh | |
| 5,910,291 A * | 6/1999 | Skalla | B01D 46/106 261/DIG. 26 |
| 6,544,210 B1 | 4/2003 | Trudel et al. | |
| 7,819,957 B2 | 10/2010 | Roberts et al. | |
| 10,335,733 B2 | 7/2019 | Bocciardo et al. | |
| 10,874,426 B2 | 12/2020 | Holsten et al. | |
| 11,105,522 B2 | 8/2021 | Kleinberger et al. | |
| 11,234,754 B2* | 2/2022 | Horner | A61B 18/1402 |
| 2005/0060974 A1* | 3/2005 | Palmerton | A61B 18/00 55/482 |
| 2018/0228510 A1 | 8/2018 | Holsten et al. | |
| 2019/0063763 A1 | 2/2019 | Kleinberger et al. | |
| 2021/0100583 A1 | 4/2021 | Holsten et al. | |
| 2021/0137583 A1* | 5/2021 | Haupt | A61B 18/1445 |
| 2021/0364171 A1 | 11/2021 | Kleinberger et al. | |
| 2022/0080136 A1* | 3/2022 | Teh | A61M 13/006 |

FOREIGN PATENT DOCUMENTS

| | | |
|---|---|---|
| EP | 3360494 A1 | 8/2018 |
| EP | 3505126 A1 | 7/2019 |

OTHER PUBLICATIONS

Machine-generated English translation of CN 207789184 U, published Aug. 31, 2018.*

* cited by examiner

SURGICAL SMOKE TREATMENT SYSTEM FOR POLAR AND NONPOLAR GASES

CROSS-REFERENCE TO RELATED APPLICATIONS

The present application claims priority to provisional U.S. Application Ser. No. 63/320,904, filed Mar. 17, 2022, to which Applicant claims the benefit of the earliest filing date of this application, which is incorporated herein by reference and made a part hereof.

BACKGROUND OF THE INVENTION

1. Field of the Invention

This invention relates to a surgical treatment system for contaminated air streams having particulate contamination, polar contamination and/or nonpolar contamination in the gas or vapor stream. A surgical smoke plume treatment system and method provide or define a multi-stage treatment process that mechanically filters the air stream, followed by nonpolar decontamination and then polar decontamination or treatment.

2. Description of the Related Art

The use of electrocautery is ubiquitous in surgical procedures for control of bleeding and tissue dissection. This process has an unfortunate side effect of creating surgical smoke from the combustion and heat-driven reactions of biological tissues. These cautery reactions create a significant plume of toxic gases, such as benzene, toluene, ethyl benzene, xylene, styrene, formaldehyde, and acetaldehyde. This results in significant occupational exposure of surgical personnel to known toxic and carcinogenic compounds. A key challenge in the remediation of surgical plume contamination is the multitude of chemical and physical compounds comprising the plume. The key object of this invention is to create a multistage treatment system, based upon gas polarity and to ensure complete treatment of dangerous compounds arising from surgical plume.

Typical remediation actions for surgical plumes are mechanical filtration and carbon filtration of smoke suctioned near the electrocautery source. Mechanical filtration typically consists of ultra-low penetration or high efficiency air filters for particulate treatment. Carbon filtration typically consists of activated carbon granules.

Most toxic gases arising from surgical smoke plume are nonpolar. However certain gases, particularly oxygenated gases such as ethers, aldehydes, ketones, and esters are polar. Formaldehyde in particular is a highly toxic polar gas. These polar pollutants have only limited adsorption by activated carbon. This is in part due to competition with polar water vapor as a significant proportion of surgical smoke is water vapor or steam. It is also in part due to the nonpolar nature of activated carbon, which creates molecular repulsion.

Certain catalytic reactions are effective at the oxidation and inactivation of polar gases. Such catalysts can catalyze at room temperature, under heat conditions, or under applied energy (i.e., electronic or photonic) conditions. These catalysts are typically metal based, such as titanium, silver, palladium, platinum, zirconium, or manganese. One limitation of these catalysts is a finite reaction constant which limits the effective capacity of these systems.

What is needed, therefore, is a surgical smoke plume treatment system that overcomes one or more problems of the past.

SUMMARY OF THE INVENTION

One primary object of the invention is to create a multi-stage decontamination and fluid, vapor or air treatment system based upon gas polarity to ensure complete treatment of dangerous compounds arising from a surgical plume or vapor of smoke.

Another primary object of the invention is to provide a multistage treatment process of gas desiccation, activated carbon adsorption of nonpolar gases, followed by a metallic catalytic oxidation of polar gases.

Another primary object of the invention is to provide a filtration system and process that is adapted to provide mechanical filtration, as well as filtration of contaminated air streams that comprise at least one of polar or nonpolar gas.

Another object of the invention is to provide a polar and nonpolar gas treatment, filtration and decontamination system in a convenient removable and compact housing that is adapted to be used with a surgical instrument or placed inside a decontamination air handler.

Still another object of the invention is to provide a predetermined order or series of steps for decontamination of an air stream, such as mechanical decontamination, followed by nonpolar decontamination, followed by polar decontamination, with or without any optional desiccation step.

Another object of the invention is to provide a decontamination system that is adapted to treat multiple types of contamination, such as particulate contamination, polar contamination and nonpolar contamination.

Yet another object is to provide a system that decontaminates a contaminant airstream in a particular decontamination order, such as mechanical, nonpolar, then polar.

Another object is to provide a decontamination system that first mechanically filters an air stream and then decontaminates an air stream of undesired polar gases and nonpolar gases.

Another object is to provide a filtration system that mechanically filters the air stream, then removes moisture from the air stream and then removes polar decontaminants from the air stream.

Another object is to provide a filtration system and method that first removes nonpolar gases from a contaminated air stream and then removes polar gases from the air stream.

In one preferred embodiment, these three elements are placed in series, co-housed in a removable cartridge for incorporation into a vacuum-powered smoke evacuation device. If the catalyst requires light or heat input, these are provided within the cartridge, with heat or light elements powered by the parent device via a reversible electrical connector.

In one aspect, another embodiment of the invention comprises a surgical smoke filtration system for receiving and treating vapor, comprising a filter; an activated carbon surface for adsorption of primarily nonpolar gases; and a metallic gas catalyst for oxidation of primarily polar volatile gases; wherein the filter, the activated carbon surface, and the metallic gas catalyst define an integrated filtration module; and the integrated filtration module further comprises a connector or connection means to attach the filtration system and an output or output means to allow for expulsion of treated surgical smoke.

In another aspect, one embodiment of the invention comprises an electrocautery and filtration system for cauterizing a surgical site associated with a patient and for treating vapor resulting therefrom, the electrocautery and filtration system comprising an electrocautery instrument that generates the vapor during a surgical procedure; and a surgical smoke treatment system for receiving and treating the vapor, comprising a filter; an activated carbon surface for adsorption of primarily nonpolar gases; and a metallic gas catalyst for oxidation of primarily polar volatile gases; wherein the filter, the activated carbon surface, and the metallic gas catalyst define an integrated filtration module; the integrated filtration module further comprises a connector or connection means to attach the electrocautery instrument and an output or output means to allow for expulsion of treated surgical smoke; wherein a passageway in the electrocautery instrument is defined by a tubular body and causes the vapor resulting from the cauterizing at the surgical site to be evacuated through the tubular body.

In another aspect, another embodiment of the invention comprises an electrocautery system for cauterizing a surgical site associated with a patient, the electrocautery system comprising a tubular body having a passageway for evacuating vapor from the surgical site; the tubular body comprising an extension for cauterizing at the surgical site; the extension being conductive and adapted to be coupled to a power source for energizing the extension; the tubular body having an inlet end having the extension and an outlet end coupled to a vacuum source adapted to create a predetermined pressure in the passageway in order to evacuate vapor from the surgical site through the tubular body prior to, during or after use of the electrocautery system at the surgical site, the vapor comprising at least one of smoke, cauterizing vapor, gas, liquid or debris; wherein the passageway is defined by the tubular body and causes the vapor resulting from the cauterizing at the surgical site to be evacuated through the tubular body; and a surgical smoke treatment system for receiving evacuated vapor and for treating it, the surgical smoke treatment system comprising a mechanical filter; an activated carbon surface for adsorption of primarily nonpolar gases; and a metallic gas catalyst for oxidation of primarily polar volatile gases; wherein the mechanical filter, activated carbon surface, and metallic gas catalyst define an integrated filtration module; the integrated filtration module further comprises a connector or connection means to attach to the electrocautery system and an output or output means to allow for expulsion of treated surgical vapor.

In another aspect, another embodiment of the invention comprises a surgical smoke treatment system comprising a mechanical filter; an activated carbon surface for adsorption of primarily nonpolar gases; and a metallic gas catalyst for oxidation of primarily polar volatile gases; wherein the filter, carbon surface, and catalyst comprise an integrated filtration module; the module further comprising a connection means to attach a surgical smoke collection means, and an output means to allow for expulsion of treated surgical smoke.

In another aspect, another embodiment of the invention comprises a method for staged treatment of nonpolar and polar gases from surgical smoke comprising evacuation of surgical smoke from a surgical environment utilizing a collection means, directing surgical smoke to an enclosed filtration area, drying the surgical smoke via desiccant or condensation, absorption via activated carbon, and oxidation and/or reduction of polar gases via metallic catalyst.

This invention, including all embodiments shown and described herein, could be used alone or together and/or in combination with one or more of the features covered by one or more of the following list of features:

The surgical smoke filtration system wherein the surgical smoke filtration system comprises a surgery instrument comprising a tubular body having a passageway for evacuating vapor from a surgical site; the tubular body comprising an extension for cauterizing at the surgical site; the extension being conductive and adapted to be coupled to a power source for energizing the extension; the tubular body having an inlet end having the extension and an outlet end coupled to a vacuum source adapted to create a predetermined pressure in the passageway in order to evacuate vapor from the surgical site through the tubular body prior to, during or after use of the filtration system at the surgical site, the vapor comprising at least one of smoke, cauterizing vapor, gas, liquid or debris.

The surgical smoke filtration system wherein the activated carbon is substantially nonpolar and a preferential adsorber of nonpolar gases; the activated carbon being activated by pyrolization, carbonization, or chemical activation, such that the activated carbon maintains nonpolar properties.

The surgical smoke filtration system wherein the catalyst comprises a metallic substrate for catalyzing oxidation reactions of polar gases, including oxidation of aldehydes into other molecules, including carbon dioxide.

The surgical smoke filtration system wherein an evacuated surgical smoke stream traverses the activated carbon surface and thence traverses the metallic gas catalyst in a substantially serial manner.

The surgical smoke filtration system wherein the carbon surface comprises a form of powdered, granular, fibrous, extruded, impregnated, coated, or woven carbon.

The surgical smoke filtration system wherein the carbon surface comprises a drying component, including at least one desiccant such as silica gel, calcium carbonate, calcium sulfate, calcium chloride, magnesium sulfate, coordination polymer, Zeolite, or molecular sieve to reduce polar competition from water vapor or humidity; wherein a condensation means such as cooling coil, dehumidifier or thermoelectric plate can be utilized in addition to or in lieu of desiccant.

The surgical smoke filtration system wherein the filter comprises an outer housing with at least one connection to a surgical smoke collection means; the collection means comprising at least one of a tubing system, vacuum system, electrocautery hand piece, funnel, gas separator, surgical port, surgical trocar, or surgical instrument.

The surgical smoke filtration system wherein the metallic gas catalyst comprises a catalyst surface containing at least one of titanium, silver, palladium, platinum, manganese, iridium, rhodium, copper, zirconium, or other metallic element capable of catalyzing oxidation or mixed oxidation-reduction reactions of organic molecules.

The surgical smoke filtration system wherein the metallic gas catalyst and/or a catalyst substrate comprises a form of one or more honeycomb, foam, extrusion, plate, coating, granule, cylinder, sphere, bead, mesh, or similar to allow for adequate contact area with gas reactant.

The surgical smoke filtration system comprising an internal activation means for activating the gas catalyst; the internal activation means comprising one or more of heating means, photon-generating means, electron-generating means, or electromagnetic radiation means.

The surgical smoke filtration system wherein the activation means is located within a substantially enclosed housing of a filter cartridge; the filter cartridge further comprising a transit means for connecting the cartridge to an external power source for powering of the activation means.

The surgical smoke filtration system wherein the surgical smoke filtration system comprises a cauterizing system for cauterizing a surgical site associated with a patient, the surgical smoke filtration system comprising a tubular body having a passageway for evacuating vapor from the surgical site; the tubular body comprising an extension for cauterizing at the surgical site; the extension being conductive and adapted to be coupled to a power source for energizing the extension; the tubular body having an inlet end having the extension and an outlet end coupled to a vacuum source adapted to create a predetermined pressure in the passageway in order to evacuate vapor from the surgical site through the tubular body prior to, during or after use of the surgical smoke filtration system at the surgical site, the vapor comprising at least one of smoke, cauterizing vapor, gas, liquid or debris; and wherein the passageway is defined by the tubular body and causes the vapor resulting from the cauterizing at the surgical site to be evacuated through the tubular body.

The surgical smoke filtration system wherein the tubular body is conductive and creates a conductive path for current to flow from a power source to the extension.

The surgical smoke filtration system wherein the extension is integral with the tubular body and both are conductive.

The surgical smoke filtration system wherein the tubular body is defined by a wall having at least one predetermined dimension, the wall defining the passageway and the extension.

The surgical smoke filtration system wherein the extension comprising a cross-sectional dimension that is smaller than the at least one predetermined dimension.

The surgical smoke filtration system wherein an elongated portion of the extension comprises a first surface and a generally opposing second surface, the first surface defining a working surface having a generally curved or arcuate portion.

The surgical smoke filtration system wherein the working surface has a radius of curvature substantially approximating a radius of curvature of the first surface.

The surgical smoke filtration system wherein the extension comprises a working surface that is generally planar.

The surgical smoke filtration system wherein the extension is detachably secured to the tubular body with a predetermined connection, the tubular body and the extension both being conductive to permit the extension to cauterize at the surgical site.

The surgical smoke filtration system wherein the predetermined connection is a least one of a threaded, press-fit, bayonet, or socket connection.

The surgical smoke filtration system wherein the passageway is substantially centrally located in the tubular body to define a substantially linear or non-serpentine conduit for evacuating the vapor.

The surgical smoke filtration system wherein the tubular body comprises an interior wall that defines the passageway, at least a portion of the interior wall having a catalyst coating.

The electrocautery and filtration system wherein the electrocautery instrument for cauterizing a surgical site comprises a tubular body having a passageway for evacuating vapor from the surgical site; the tubular body comprising an extension for cauterizing at the surgical site; the extension being conductive and adapted to be coupled to a power source for energizing the extension; the tubular body having an inlet end having the extension and an outlet end coupled to a vacuum source adapted to create a predetermined pressure in the passageway in order to evacuate vapor from the surgical site through the tubular body prior to, during or after use of the electrocautery instrument at the surgical site, the vapor comprising at least one of smoke, cauterizing vapor, gas, liquid or debris;

The electrocautery and filtration system wherein the activated carbon is substantially nonpolar and a preferential adsorber of nonpolar gases; the activated carbon being activated by pyrolization, carbonization, or chemical activation, such that the activated carbon maintains nonpolar properties.

The electrocautery and filtration system wherein the catalyst comprises a metallic substrate for catalyzing oxidation reactions of polar gases, including oxidation of aldehydes into other molecules, including carbon dioxide.

The electrocautery and filtration system wherein a evacuated surgical smoke stream traverses the activated carbon surface and thence traverses the metallic gas catalyst in a substantially serial manner.

The electrocautery and filtration system wherein the carbon surface comprises a form of powdered, granular, fibrous, extruded, impregnated, coated, or woven carbon.

The electrocautery and filtration system wherein the carbon surface comprises a drying component, including at least one desiccant such as silica gel, calcium carbonate, calcium sulfate, calcium chloride, magnesium sulfate, coordination polymer, Zeolite, or molecular sieve to reduce polar competition from water vapor or humidity; wherein a condensation means such as cooling coil, dehumidifier or thermoelectric plate can be utilized in addition to or in lieu of desiccant.

The electrocautery and filtration system wherein the filter comprises an outer housing with at least one connection to a surgical smoke collection means; the collection means comprising at least one of a tubing system, vacuum system, electrocautery hand piece, funnel, gas separator, surgical port, surgical trocar, or surgical instrument.

The electrocautery and filtration system wherein the metallic gas catalyst comprises a catalyst surface containing at least one of titanium, silver, palladium, platinum, manganese, iridium, rhodium, copper, zirconium, or other metallic element capable of catalyzing oxidation or mixed oxidation-reduction reactions of organic molecules.

The electrocautery and filtration system wherein the metallic gas catalyst and/or a catalyst substrate comprises a form of one or more honeycomb, foam, extrusion, plate, coating, granule, cylinder, sphere, bead, mesh, or similar to allow for adequate contact area with gas reactant.

The electrocautery and filtration system comprising an internal activation means for activating the gas catalyst; the internal activation means comprising one or more of heating means, photon-generating means, electron-generating means, or electromagnetic radiation means.

The electrocautery and filtration system activation means wherein the activation means is located within a substantially enclosed housing of a filter cartridge; the filter cartridge further comprising a transit means for connecting the cartridge to an external power source for powering of the activation means.

The electrocautery and filtration system wherein the cautery instrument comprises a cauterizing system for cauterizing a surgical site associated with a patient, the surgical smoke treatment system comprising a tubular body having a passageway for evacuating vapor from the surgical site; the tubular body comprising an extension for cauterizing at the surgical site; the extension being conductive and adapted to be coupled to a power source for energizing the extension; the tubular body having an inlet end having the extension and an outlet end coupled to a vacuum source adapted to create a predetermined pressure in the passageway in order to evacuate vapor from the surgical site through the tubular body prior to, during or after use of the surgical smoke treatment system at the surgical site, the vapor comprising at least one of smoke, cauterizing vapor, gas, liquid or debris; and wherein the passageway is defined by the tubular body and causes the vapor resulting from the cauterizing at the surgical site to be evacuated through the tubular body.

The electrocautery and filtration system wherein the tubular body is conductive and creates a conductive path for current to flow from a power source to the extension.

The electrocautery and filtration system wherein the extension is integral with the tubular body and both are conductive.

The electrocautery and filtration system wherein the tubular body is defined by a wall having at least one predetermined dimension, the wall defining the passageway and the extension.

The electrocautery and filtration system wherein the extension comprising a cross-sectional dimension that is smaller than the at least one predetermined dimension.

The electrocautery and filtration system wherein an elongated portion of the extension comprises a first surface and a generally opposing second surface, the first surface defining a working surface having a generally curved or arcuate portion.

The electrocautery and filtration system wherein the working surface has a radius of curvature substantially approximating a radius of curvature of the first surface.

The electrocautery and filtration system wherein the extension comprises a working surface that is generally planar.

The electrocautery and filtration system wherein the extension is detachably secured to the tubular body with a predetermined connection, the tubular body and the extension both being conductive to permit the extension to cauterize at the surgical site.

The electrocautery and filtration system wherein the predetermined connection is a least one of a threaded, press-fit, bayonet, or socket connection.

The electrocautery and filtration system wherein the passageway is substantially centrally located in the tubular body to define a substantially linear or non-serpentine conduit for evacuating the vapor.

The electrocautery and filtration system wherein the tubular body comprises an interior wall that defines the passageway, at least a portion of the interior wall having a catalyst coating.

The electrocautery system wherein the tubular body is conductive and creates a conductive path for current to flow from a power source to the extension.

The electrocautery system wherein the extension is integral with the tubular body and both are conductive.

The electrocautery system wherein the tubular body is defined by a wall having at least one predetermined dimension, the wall defining the passageway and the extension.

The electrocautery system wherein the extension comprising a cross-sectional dimension that is smaller than the at least one predetermined dimension.

The electrocautery system wherein an elongated portion of the extension comprises a first surface and a generally opposing second surface, the first surface defining a working surface having a generally curved or arcuate portion.

The electrocautery system wherein the working surface has a radius of curvature substantially approximating a radius of curvature of first surface.

The electrocautery system wherein the extension comprises a working surface that is generally planar.

The electrocautery system wherein the extension is detachably secured to the tubular body with a predetermined connection, the tubular body and the extension both being conductive to permit the extension to cauterize at the surgical site.

The electrocautery system wherein the predetermined connection is at least one of a threaded, press-fit, bayonet, or socket connection.

The electrocautery system wherein the passageway is substantially centrally located in the tubular body to define a substantially linear or non-serpentine conduit for evacuating the vapor.

The electrocautery system wherein the activated carbon surface is substantially nonpolar and a preferential adsorber of nonpolar gases; the activated carbon surface being activated by pyrolization, carbonization, or chemical activation, such that the activated carbon surface maintains nonpolar properties.

The electrocautery system wherein the metallic gas catalyst comprises a metallic substrate for catalyzing oxidation reactions of polar gases, including oxidation of aldehydes into other molecules, including carbon dioxide.

The electrocautery system wherein an evacuated surgical smoke stream traverses the activated carbon surface and thence traverses the metallic gas catalyst in a substantially serial manner.

The electrocautery system wherein the activated carbon surface comprises a form of powdered, granular, fibrous, extruded, impregnated, coated, or woven carbon.

The electrocautery system wherein the activated carbon surface comprises a drying component, including at least one desiccant such as silica gel, calcium carbonate, calcium sulfate, calcium chloride, magnesium sulfate, coordination polymer, Zeolite, or molecular sieve to reduce polar competition from water vapor or humidity; wherein a condensation means such as cooling coil, dehumidifier or thermoelectric plate can be utilized in addition to or in lieu of desiccant.

The electrocautery system wherein the mechanical filter comprises an outer housing with at least one connection to a surgical smoke collection means; the surgical smoke collection means comprising at least one of a tubing system, vacuum system, electrocautery hand piece, funnel, gas separator, surgical port, surgical trocar, or surgical instrument.

The electrocautery system wherein the metallic gas catalyst comprises a catalyst surface containing at least one of titanium, silver, palladium, platinum, manganese, iridium, rhodium, copper, zirconium, or other metallic element capable of catalyzing oxidation or mixed oxidation-reduction reactions of organic molecules.

The electrocautery system wherein the metallic gas catalyst and/or the metallic substrate comprises a form of one or more honeycomb, foam, extrusion, plate, coating, granule, cylinder, sphere, bead, mesh, or similar to allow for adequate contact area with gas reactant.

The electrocautery system comprising an internal activation means for activating the metallic gas catalyst; the internal activation means comprising one or more of heating means, photon-generating means, electron-generating means, or electromagnetic radiation means.

The electrocautery system wherein the internal activation means is located within a substantially enclosed housing of a filter cartridge; the filter cartridge further comprising a transit means for connecting the filter cartridge to an external power source for powering of the internal activation means.

The electrocautery system wherein the tubular body comprises an interior wall that defines the passageway, at least a portion of the interior wall having a catalyst coating.

The surgical smoke treatment system wherein the activated carbon is substantially nonpolar and a preferential absorber of nonpolar gases; the activated carbon being activated by pyrolization, carbonization, or chemical activation, such that the activated carbon maintains nonpolar properties.

The surgical smoke treatment system wherein the catalyst comprises a metallic substrate for catalyzing oxidation reactions of polar gases, including oxidation of aldehydes into other molecules, including carbon dioxide.

The surgical smoke treatment system wherein a evacuated surgical smoke stream traverses the activated carbon surface and thence traverses the metallic gas catalyst in a substantially serial manner.

The surgical smoke treatment system wherein the carbon surface comprises a form of powdered, granular, fibrous, extruded, impregnated, coated, or woven carbon.

The surgical smoke treatment system wherein the carbon surfaces cooperates with a drying component, including at least one desiccant such as silica gel, calcium carbonate, calcium sulfate, calcium chloride, magnesium sulfate, coordination polymer, Zeolite, or molecular sieve to reduce polar competition from water vapor or humidity; wherein a condensation means such as cooling coil, dehumidifier or thermoelectric plate can be utilized in addition to or in lieu of desiccant.

The surgical smoke treatment system wherein the filter comprises an outer housing with at least one connection to a surgical smoke collection means; the collection means comprising at least one of a tubing system, vacuum system, electrocautery hand piece, funnel, gas separator, surgical port, surgical trochar, or surgical instrument.

The surgical smoke treatment system wherein the metallic gas catalyst comprises a catalyst surface containing at least one of titanium, silver, palladium, platinum, manganese, iridium, rhodium, copper, zirconium, or other metallic element capable of catalyzing oxidation or mixed oxidation-reduction reactions of organic molecules.

The surgical smoke treatment system wherein the metallic gas catalyst and/or a catalyst substrate comprises a form of one or more honeycomb, foam, extrusion, plate, coating, granule, cylinder, sphere, bead, mesh, or similar to allow for adequate contact area with gas reactant.

The surgical smoke treatment system comprising an internal activation means for activating the gas catalyst; the internal activation means comprising one or more of heating means, photon-generating means, electron-generating means, or electromagnetic radiation means.

The surgical smoke treatment system wherein the activation means are located within a substantially enclosed housing of a filter cartridge; the cartridge further comprising a transit means for connecting the cartridge to an external power source for powering of the activation means.

These and other objects and advantages of the invention will be apparent from the following description, the accompanying drawings and the appended claims.

BRIEF DESCRIPTION OF THE ACCOMPANYING DRAWINGS

DETAILED DESCRIPTION OF THE PREFERRED EMBODIMENTS

Figure 1:
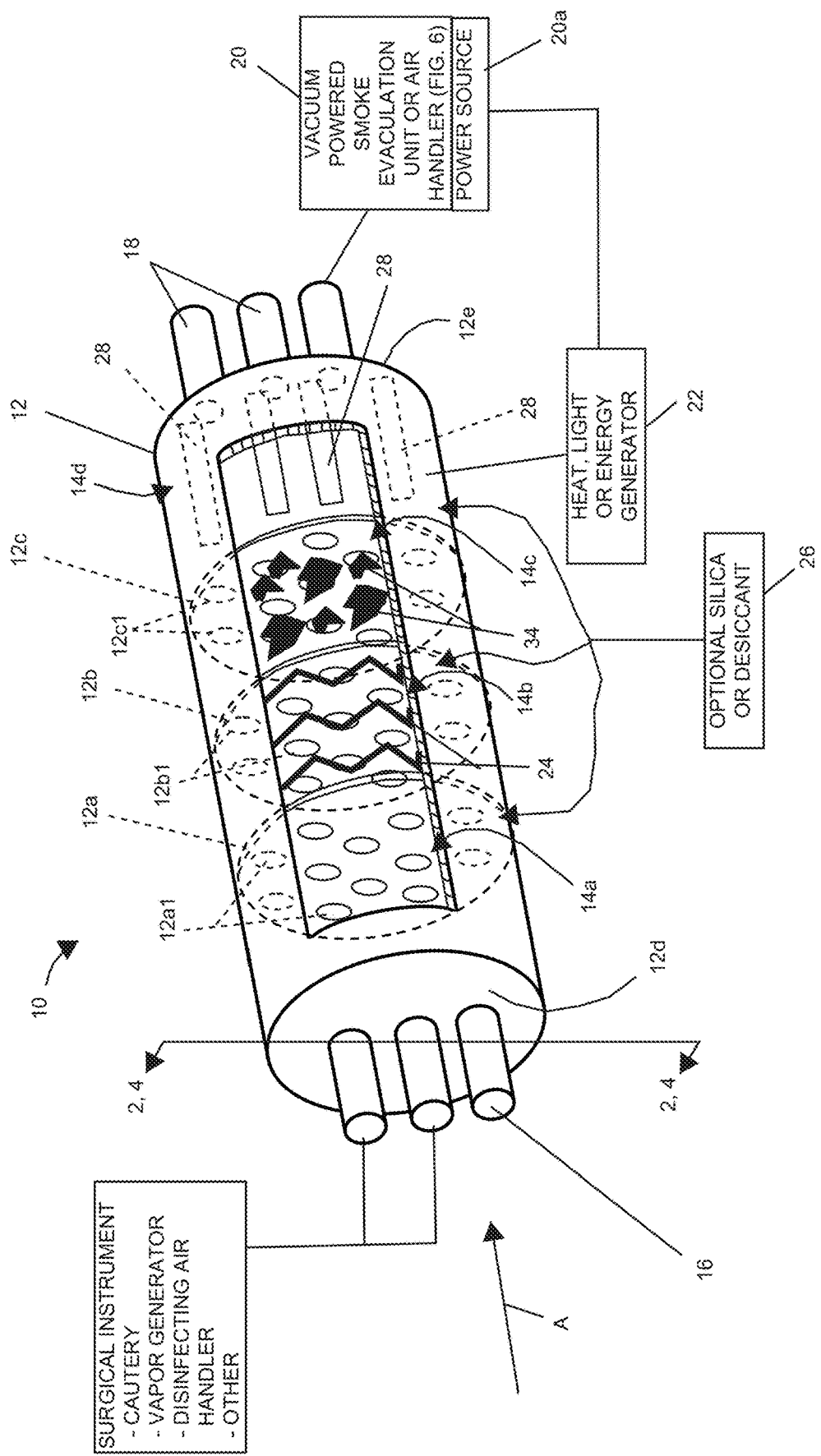
FIG. 1 is a perspective view of one embodiment of a system and method for treating a contaminated air stream.

Referring now to FIGS. 1-7, a surgical smoke treatment system 10 and method are shown. It should be appreciated that the surgical smoke treatment system 10 is particularly adapted to treat polar and nonpolar gases as well as perform mechanical filtration of a contaminated air stream (AS). In one illustrative embodiment, the surgical smoke treatment system 10 is particularly adapted for use in creating a multi-stage treatment system based upon gas polarity to ensure complete treatment of dangerous vapors and compounds arising from a surgical plume, which can occur during a surgical procedure. The multi-stage treatment process and system provides for mechanical filtration of particulate matter, followed by optional gas desiccation, activated carbon adsorption of nonpolar gases, followed by a metallic catalytic oxidation of polar gases. In one preferred embodiment, these three elements are placed in series, co-housed in a removable cartridge for incorporation into a vacuum-powered smoke evacuation device, like the air handler 40 shown in FIG. 6 and which will be described in detail later herein. It should be understood that if the catalyst requires light or heat input, then these are provided within the cartridge with heat or light elements powered by the same or a separate device, such as the vacuum-powered smoke evacuation device like is shown and described herein.

Referring now to FIGS. 1-7, further details of an illustrative embodiment are shown. The surgical smoke treatment system 10 comprises a housing 12 that is generally cylindrical in the illustration being described, but it should be understood that it could be any desired shape that provides the various filtration areas and directs air flow. In the illustration being described, the housing 12 has a plurality of walls 12a, 12b and 12c that define separate areas 14a, 14b, 14c and 14d, all of which will be described in detail later herein. The housing 12 itself can be made of any suitable material such as a plastic, a metallic or a polymer material.

Figure 6:
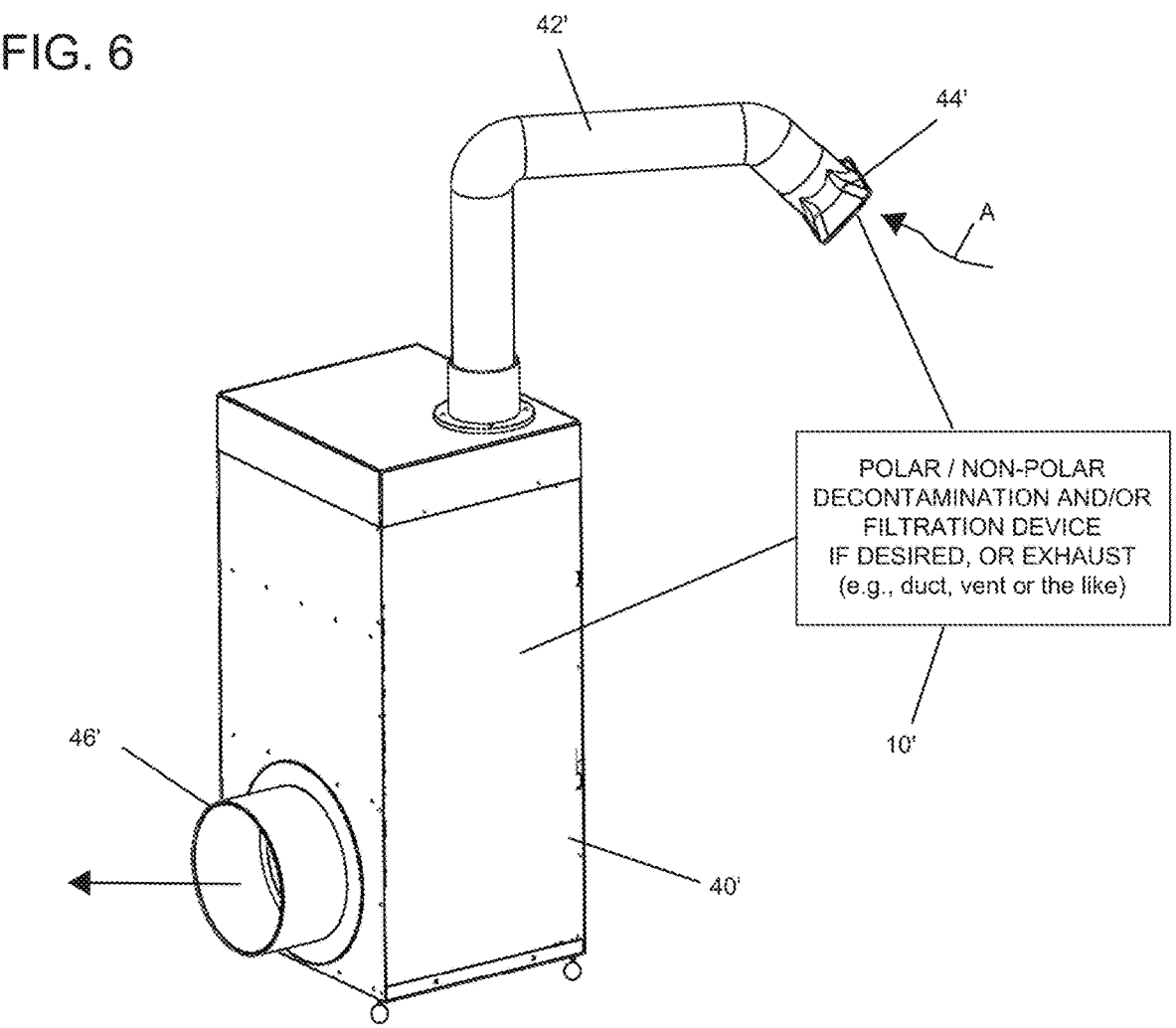
FIG. 6 is a view illustrating the filtration system integrated with an air handler, either internally in the air handler or in a nozzle arm or end of the air handler.

The housing 12 comprises at least one or a plurality of inlets 16 coupled to or integral with a first end wall 12d and at least one or a plurality of outlets 18 coupled to and integral with a second end wall 12e. The surgical smoke treatment system 10 may be coupled to, used with or integrated with an instrument like an electrocautery device 50, as shown and described in FIG. 7, or may be coupled to a vacuum powered smoke evacuation unit or air handler 40 (FIG. 6). In this regard, it should be understood that the surgical smoke treatment system 10 may be incorporated in the air handler 40. For example, FIG. 6 illustrates an air handler 40 owned and provided by the Assignee of the present application which is the subject of U.S. Pat. Nos. 10,702,435 and 11,185,457 and U.S. Publication No. 2022-0031545, all of which are expressly incorporated herein by reference and made a part hereof. It should be understood that the surgical smoke treatment system 10 may be incorporated directly inside the air handler 40 or in a nozzle arm 42 as illustrated in FIG. 6 or a nozzle end 44 of the air handler 40 as shown in FIG. 6.

The filtration areas 14a-14d and decontamination will now be described. Note in FIG. 1, that the area 14a is dedicated to provide an area for smoke intake from the plurality of inlets 16. It should be understood that contaminated air flows into the surgical smoke treatment system 10 in the direction of arrow A and that a vacuum source, such as the vacuum powered evacuation unit or air handler 40 (FIG. 6), provides a negative pressure on the outlets 18 to provide a vacuum through the surgical smoke treatment system 10. The contaminated air stream AS enters into the area 14a and passes through the apertures 12a1 of the wall 12a and enters into the area 14b for mechanical filtration that houses a mechanical filter 24. In the illustration being described, the mechanical filtration typically comprises an ultra-low penetration or high-efficiency air filter for particulate treatment, such as a HEPA filter or the like, for particulate treatment. The mechanical filter 24 may be mounted to the side of the housing 12 via sliding from a slot (not shown) in the side.

The air stream then passes through the apertures 12b1 of wall 12b where it enters the area 14c. This area 14c comprises a plurality of activated carbon granules 34 that are adapted to treat the vapor or plume of smoke as it passes by and is treated by the plurality of activated carbon granules 34 to treat the nonpolar vapor contaminants. In an illustrative embodiment, the areas 14a-14c may comprise an optional desiccant or silica gel 26 (FIG. 5) for adsorption of moisture and fluids. In the illustration, the carbon granules 34 are deposited in the area and interrupt the air stream as it passes through the area 14c. The carbon granules 34 can be placed in a mesh sack, mesh enclosure with a rigid frame, or in another external container (not shown) which allows for air to pass through while containing the carbon granules 34.

In the example, the activated carbon granules 34 are substantially nonpolar and a preferential adsorber of nonpolar gases and are activated by pyrolization, carbonization, or chemical activation, such that the activated carbon granules 34 maintains nonpolar properties. After the treatment by the mechanical filtration of nonpolar gases in the area 14b and nonpolar gases in area 14c, the air stream passes through the apertures 12c1 of wall 12c and into the area 14d where the polar gas portion of the vapor or air stream AS is treated. In this regard, while most toxic gases arising from surgical smoke, vapor or plumes are nonpolar, certain gases, particularly oxygenated gases, such as ethers, aldehydes, ketones and esters are polar. Formaldehyde in particular is a highly toxic polar gas. These polar pollutants have only limited adsorption by activated carbon in the area 14c.

Figure 2:
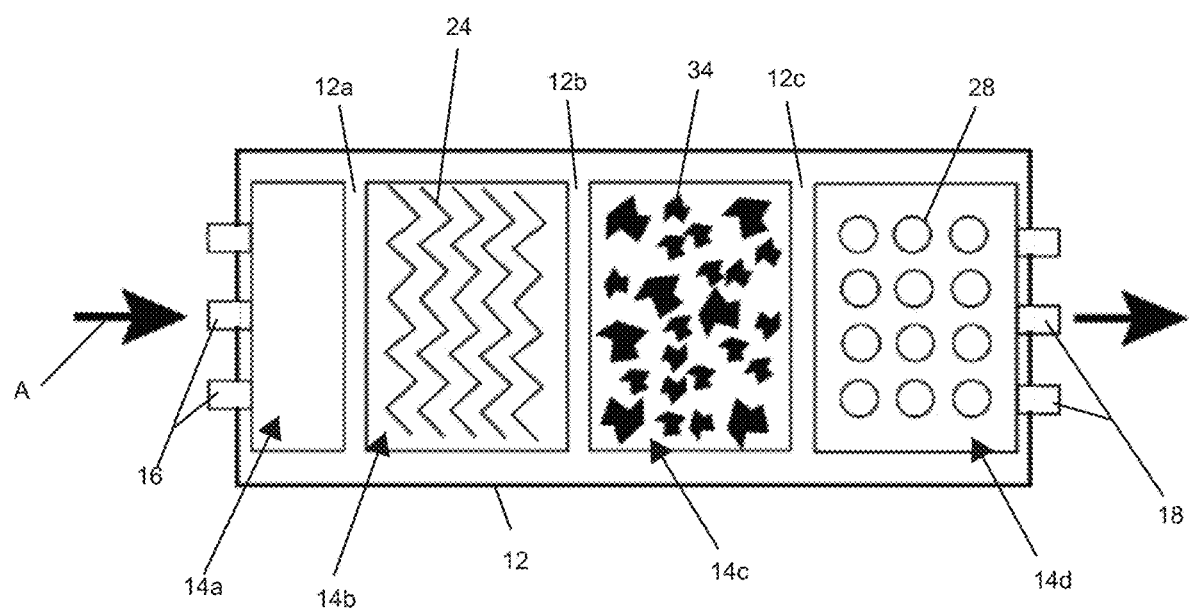
FIG. 2 is a view taken along the line 2-2 in FIG. 1.

The area 14d comprises metallic catalyst surfaces 28a for the metallic gas catalyst 28 as illustrated in FIG. 2. In one illustrative embodiment, the metallic gas catalyst 28 comprises a catalyst surface 28a (FIG. 4) containing at least one of titanium, silver, palladium, platinum, manganese, iridium, rhodium, copper, zirconium, or other metallic element capable of catalyzing oxidation or mixed oxidation-reduction reactions of organic molecules. Moreover, the metallic gas catalyst 28 comprises a form of one or more honeycomb, foam, extrusion, plate, coating, granule, cylinder, sphere, bead, mesh, or similar to allow for adequate contact area with gas reactant. The metallic catalyst 28 is represented in FIGS. 1-5 as bars or circles, but it should be understood that they could comprise any suitable shape. The metallic catalyst 28 is affixed either on the walls of the housing 12, on a foam, mesh, granule, airfoil, blade, or on the surface of a mechanical filter 24. The features of the catalytic oxidation are shown schematically in FIG. 2 and in more detail in FIGS. 3 and 4. The nonpolar filtration area 14c has little or limited effect on the polar gases. This is in part due to competition with polar water vapor as a significant proportion of surgical smoke because a significant portion of the surgical smoke comprises water vapor or steam. Certain catalytic reactions are effective at the oxidation and inactivation of polar gases. Catalysts can catalyze at room temperature or under heat condition or applied energy (i.e., electronic or photonic energy) as mentioned earlier. Again, these catalysts are typically metal based, such as titanium, silver, palladium, platinum, zirconium, or manganese. Having the metallic catalyst surface 28a for the metallic gas catalyst 28 in the area 14d enables the surgical smoke treatment system 10 to effectively treat multiple types of polar contamination in the vapor or smoke plume.

The catalysts are placed in the area and mounted on an inside wall 12a of the housing 12 using conventional means, such as an adhesive hot weld. As mentioned earlier, the carbon granules 34 can be placed in a mesh sack, mesh enclosure with a rigid frame, or in another external container (not shown) which allows for air to pass through while containing the carbon granules 34.

During operation, mechanical filtration occurs first, followed by nonpolar gas filtration, and then followed by polar vapor or gas filtration. The inventor has found this specific order of filtration and decontamination to be important because mechanical filtration must occur first, or the whole system 10 may become contaminated with dust. Carbon filtration should occur second, removing most (nonpolar) volatile organic compounds (VOCs) and allowing for less competition for the catalyst 28. By providing all of these filtration approaches in one convenient housing 12, a large majority of the contaminants in the contaminated air stream AS can be treated.

Advantageously, in the illustration being described, the housing 12 is generally cylindrical and elongated as shown in FIGS. 1 and 2. The length and diameter dimensions may be variable, but in one illustrative embodiment they are about 12"×12"×6". The surgical smoke treatment system 10 can be a stand-alone system used, for example, with a cautery instrument of the type described later herein relative to FIG. 7, or alternatively, it could be removably situated in or integrated with a decontamination system, such as in the nozzle end of the air handler 40 (FIG. 6) or in the main housing of an air handler 40 (FIG. 6). These features will be described later herein relative to FIGS. 6 and 7.

Figure 3:
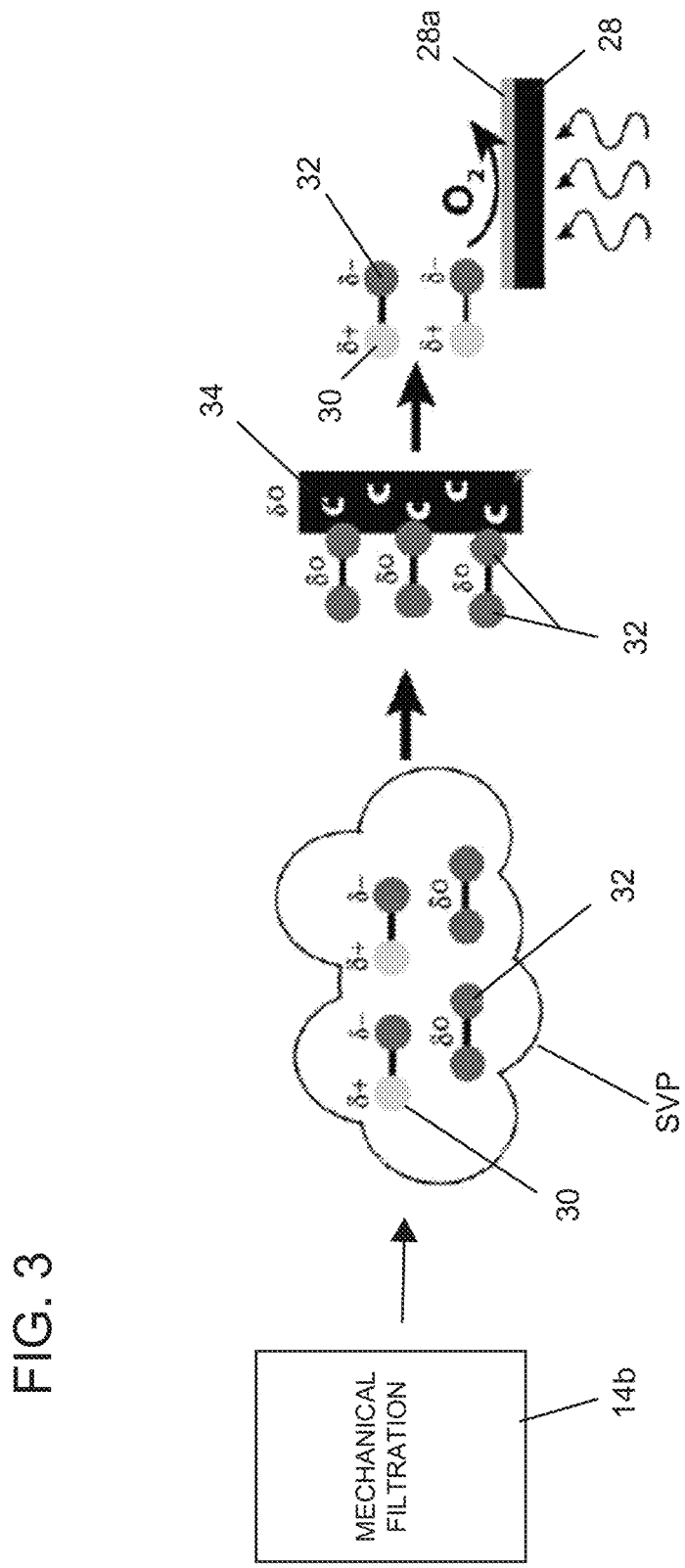
FIG. 3 is a view of polar and nonpolar gases, decontamination or filtration, preceded by mechanical filtration as shown in FIG. 1.
Figure 4:
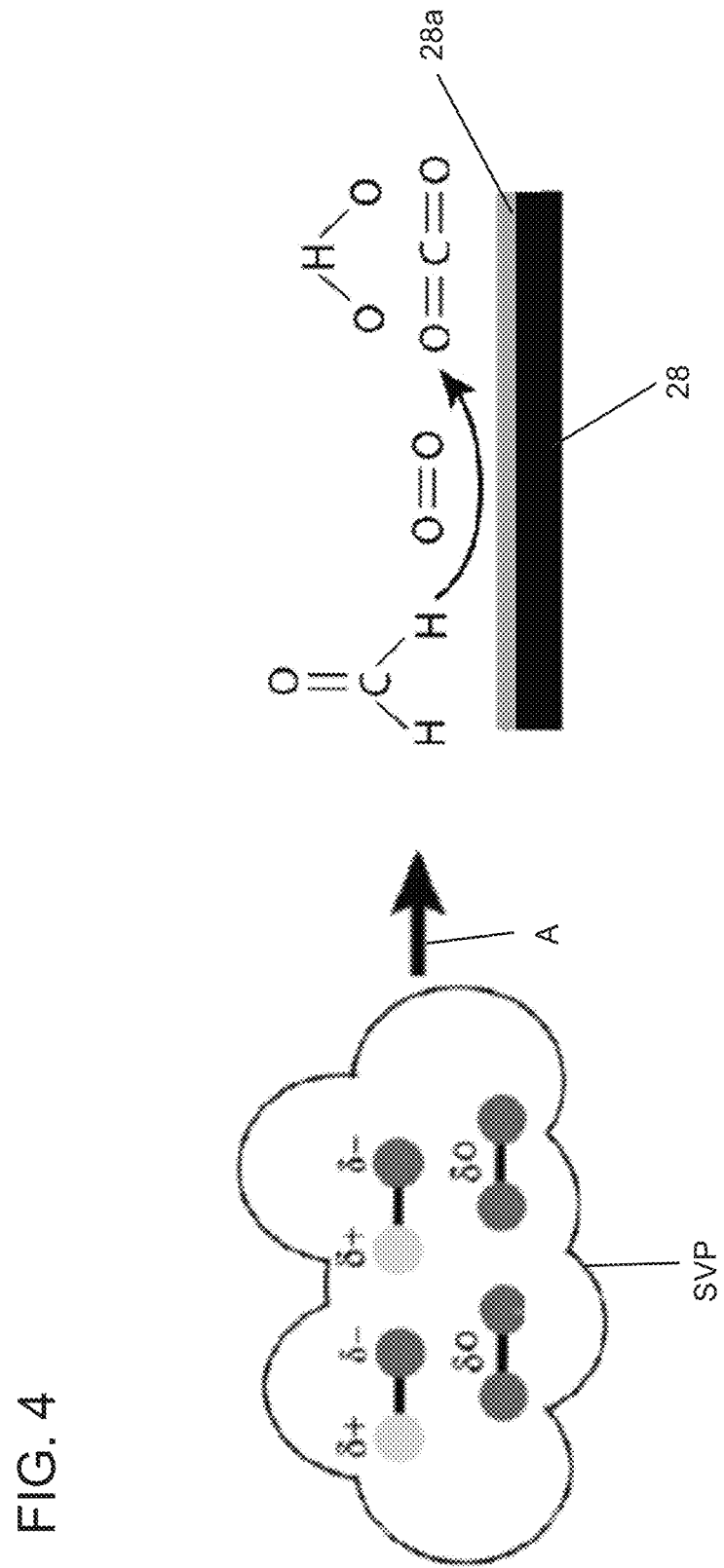
FIG. 4 is a view illustrating the catalytic reaction, similar to FIG. 3, that occurs in the catalytic area of the system.
Figure 5:
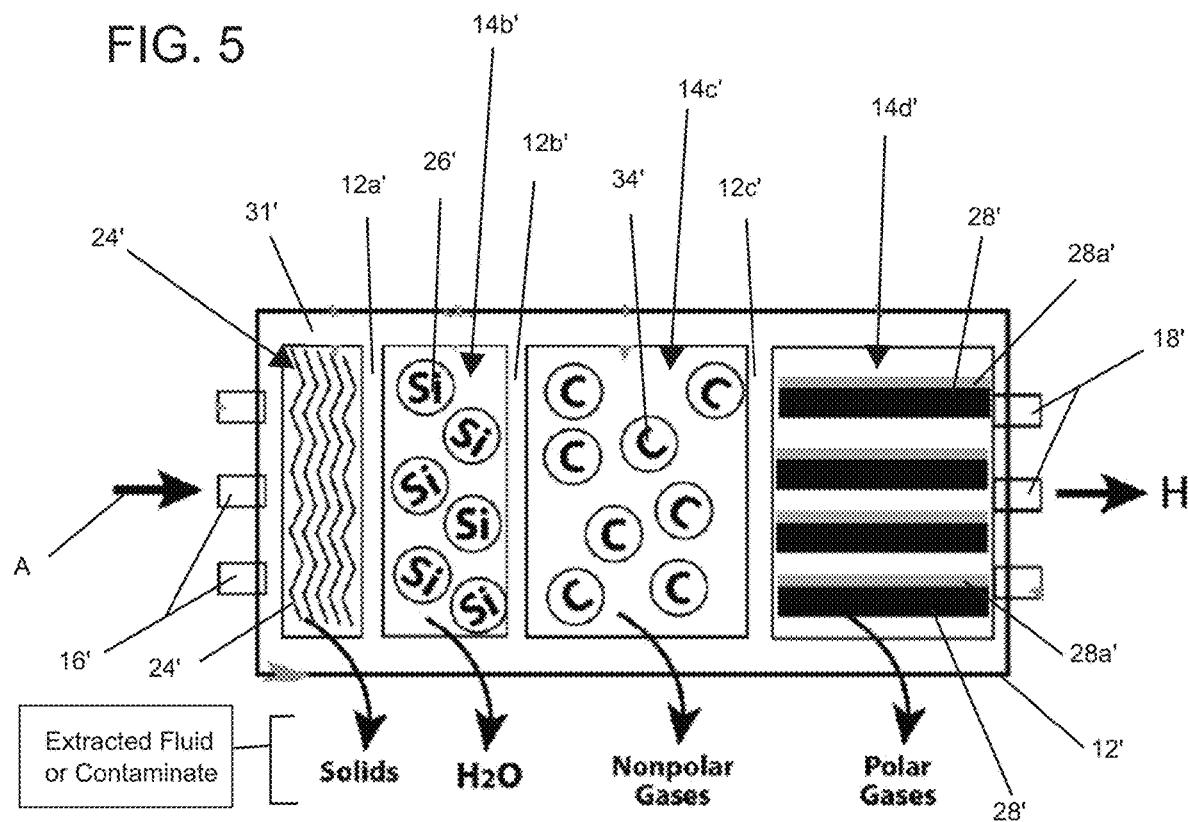
FIG. 5 is another view, similar to FIG. 1, showing another embodiment of the invention.

Referring now to FIGS. 3-5, mechanical filtration and treatment of the polar and nonpolar gases within the surgical smoke plume or vapor plume will now be described. As illustrated in FIG. 3, a vapor or plume SVP (FIG. 3) comprises a mixture of both polar and nonpolar toxic gases. The polar molecules are labeled 30, and the nonpolar molecules are labeled 32 for ease of illustration. The activated carbon granules is labeled 34 in FIG. 3, and the activated carbon granules 34 selectively adsorbs the nonpolar gas molecules 32.

As the air stream passes through the housing 12, the remaining polar molecules 30 (FIG. 3), pass from the area 14c and through the apertures 12c1 of the wall 12c and into area 14d. Polar molecules 30 transit past the metallic gas catalyst 28 and are oxidized at the metallic catalyst surface 28a as illustrated in FIG. 3. As mentioned earlier, the catalytic reaction can be enhanced or improved by applying an external heat or energy source 22 (FIG. 1) to facilitate or improve the catalytic reaction. Note that if the catalytic oxidation process requires heat or light, then the housing 12 may comprise the external heat or energy source 22 that is powered by a power source 20a of the vacuum source 20 as illustrated in FIG. 1.

Referring now to FIG. 4, details of the metallic catalyst surface 28a and the catalytic reaction are shown. For ease of illustration, it is presumed that the smoke vapor plume (SVP) comprises polar contamination. In the illustration being described, the catalyst comprises the metallic gas catalyst 28 described earlier herein having the metallic catalyst surface 28a. As the polar gas counters the metallic catalyst surface 28a, a catalytic reaction occurs which eliminates the polar gases in the vapor or gas stream. The toxic vapors or polar gases are consequently removed from the air stream AS. The metallic catalyst surface 28a needs to be exposed to the totality of the air stream AS.

In one illustrative embodiment, it is preferred to first remove the particulate materials via mechanical filtration with the mechanical filter 24 from the air stream at area 14a in FIG. 5 and then to treat the air stream and remove excess moisture or water. This can occur in any of the areas 14a-14c using an optional desiccant or silica gel 26 (FIGS. 1 and 5). Thereafter, the nonpolar gases are treated and removed (at area 14c') and then subsequently, the polar gases are treated by the catalytic reaction in area 14d'. This is the order and sequence preferred to remove the $H_2O$ before the catalytic removal of polar gases because the catalytic conversion is more efficient. It should be understood that the water or moisture must be removed first because the polar volatile organic compound (VOC) will dissolve in water making catalytic removal more difficult. As mentioned earlier, heat or light may be provided by the external heat or energy source 22 (FIG. 1) to improve or facilitate the catalytic process.

Advantageously, the surgical smoke treatment system 10 and housing 12 are provided and co-housed in a removeable cartridge for incorporation into a vacuum-powered smoke evacuation device. For example, the Assignee of the present application contemplates that the surgical smoke treatment system 10 may be situated in an air handler 40 (FIG. 6) of the type currently marketed and distributed by the Assignee of the present application. In this regard, notice in FIG. 6, the air handler 40 is provided and has a nozzle arm 42 and a nozzle end 44 in which the surgical smoke treatment system 10 and the housing 12 may be integrated or situated. The air handler 40 may also comprise additional internal mechanical filtration. It is contemplated that the surgical smoke treatment system 10 could be situated in the air stream therein in order to treat the air stream before it exits the outlet 46 (FIG. 6). Advantageously, the housing 12 may be situated in the nozzle end 44 of the air handler 40 which, in turn, may be maneuvered in close proximity to a patient or operating area or other area where it is important to treat a decontaminated air stream in the manner described in the cited references. This unit can be used alone or in combination with the unit shown in FIG. 6 and which is the subject of U.S. Pat. Nos. 10,702,435 and 11,185,457 and U.S. Publication No. 2022-0031545, all of which are expressly incorporated herein by reference and made a part hereof. Several suitable unit(s) include the ILLUVIA®, ILLUVIA® SENSE, AEROCURE® or GERMZONE®, all of which are available from Aerobiotix, LLC located in Miamisburg, Ohio, and are contemplated to be used in combination with the surgical smoke treatment system 10 if desired.

Referring now to FIG. 5, another embodiment and schematic demonstrating the surgical smoke treatment system 10 is shown. In these embodiments, the same or similar parts are identified with the same part numbers, except that one prime mark ("'") has been added to the part numbers for the different embodiment of FIG. 5. As with the prior embodiments, the contaminated surgical plume or vapor enters in the direction of arrow A and then into the area 14a'. A mechanical filter 24' is situated in area 14a' and captures airborne solids and particulates after the contaminated air stream AS is subject to drying using the optional desiccant or silica gel 26'. For ease of understanding, FIG. 5 illustrates (in the bottom portion of the figure) each type of contaminant gas that irradiates from the area 14a'-14d' for ease of understanding. For example, area 14a' filters out solids and particulates and this is shown in FIG. 5. Likewise, the optional desiccant or silica gel 26' filters out or irradiates excess water molecules in a manner that is conventionally known. In one illustrative embodiment, the optional desiccant or silica gel 26' may be a silica gel that performs the water adsorption. Thereafter, the nonpolar gases are filtered in area 14c' and then the surfaces 28a' for the metallic gas catalyst 28' in area 14d' treats the polar gas or vapor with the metallic gas catalyst 28'. The substantially nonpolar activated carbon granules 34' are adapted to treat the contaminated air stream AS and remove nonpolar gases and vapors therefrom. As the air stream AS enters through the area 14d', the metallic gas catalyst 28' inactivates the toxic polar gases in the air stream AS. Ultimately, the treated and decontaminated vapor or smoke is expelled via the outlets 18' and to the vacuum source 20' (FIG. 1).

The surgical smoke treatment system 10' and process described herein is effective at treating multiple types of contamination in a vapor or smoke stream. This is particularly useful in a surgical or hospital environment.

Figure 7:
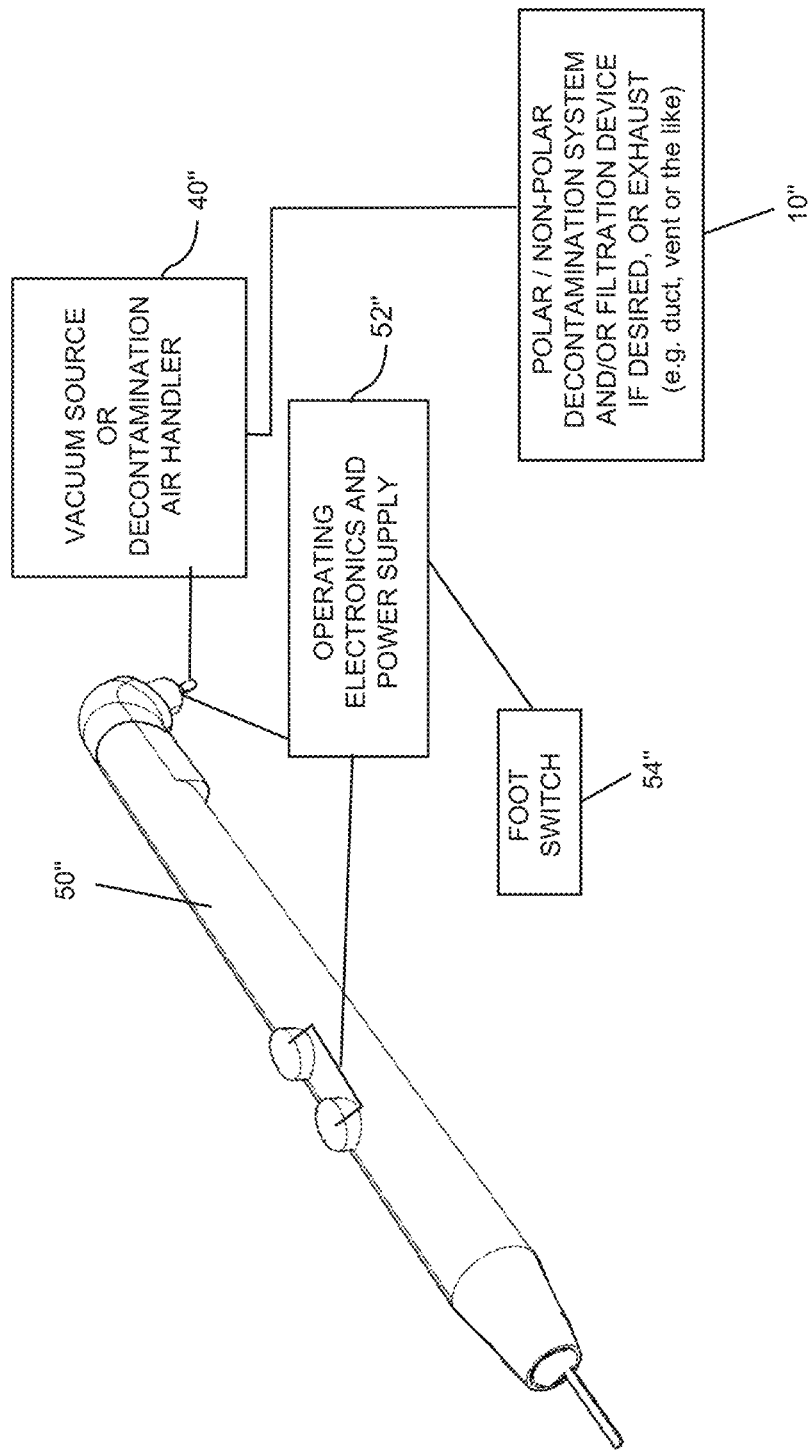
FIG. 7 is a view illustrating the filtration system used in combination with a surgical instrument, such as a cautery instrument.

Referring now to FIG. 7, another illustrative adaptation or embodiment of the surgical smoke treatment system 10" is shown in use and combination with an electrocautery device 50". In this embodiment, the same or similar parts are identified with the same part numbers, except that a double prime mark ("''") has been added to the part numbers for the embodiment of FIG. 7. The Inventor contemplates that the surgical smoke treatment system 10" can be used in combination with a surgical instrument 50". One type of surgical instrument that the surgical smoke treatment system 10" could be used in combination with is illustrated in FIG. 7. The inventors contemplate that the electrocautery device 50" could be used during a surgical procedure in a vacuum source, such as the air handler 40", and may comprise an electronic and power supply 52" and foot switch 54" for operating the electrocautery device 50" in the manner described earlier herein in the before-mentioned U.S. patents and U.S. patent applications. The surgical smoke treatment system 10" is either integrated with or coupled to the vacuum source 20". As mentioned earlier, the surgical smoke treatment system 10" may be situated in the air handler 40" or in, for example, a nozzle arm 42" or nozzle end 44" of the air handler 40". Advantageously, the combination of using a surgical instrument with the surgical smoke treatment system 10" is particularly advantageous in surgical procedures where plumes of smoke are generated by the electrocautery device 50". As mentioned earlier, the plumes of smoke can have particulate contamination, polar contamination, and nonpolar contamination, all of which are treated by the surgical smoke treatment system 10" before the air stream is exhausted into the local environment.

Returning to FIGS. 1-5, the multi-stage treatment process of gas desiccation, activated carbon adsorption of nonpolar gases followed by a metallic catalytic oxidation of polar gases occurs. In the preferred embodiment, these elements are placed in series, as illustrated in FIG. 1 and housed in a removable cartridge container or housing 12 that is generally cylindrical and made of a plastic, metallic or polymer material and adapted to house the mechanical filter and, optionally, the optional desiccant or silica gel 26 in any areas 14a-14c. The contaminated air passes in the direction of arrow A into the plurality of inlets 16 as a vacuum or negative pressure is being applied at the outlets 18. Contaminated air flow in the direction of arrow A enters the area 14a and passes past the wall 12a through the apertures 12a1 into the area 14b. In area 14b, as explained earlier herein, mechanical filtration occurs and the contaminated air continues to pass through the wall 12b and through the apertures 12b1, whereupon it enters area 14c where carbon granules 34 (with or without optional desiccant) treats the air stream with or eliminates any nonpolar vapor or gases before it passes through the wall 12c and through the apertures 12c1 of wall 12c and into the area 14d. As mentioned earlier, in area 14d, catalytic oxidation occurs providing the metallic gas catalyst 28 that will cause a catalytic reaction and to effectively eliminate any polar gases whereupon they are oxidized and inactivated once they are exposed to the metallic catalyst surface 28a in the area 14d. It should be understood that such catalysts can catalyze at room temperature, under heat conditions or under applied energy, such as electronic or photonic energy conditions. The typical catalysts are metal-based, such as titanium, silver, palladium, platinum, zirconium, or manganese.

Returning to FIG. 1 and as mentioned earlier, note that if the catalytic oxidation process requires heat or light, then the housing 12 may comprise the external heat or energy source 22 (FIG. 1) that is powered by a power source 20a of the vacuum source 20 as illustrated.

ADDITIONAL COMMENTS AND CONSIDERATIONS

1. It should be understood that the activated carbon granules 34 are substantially nonpolar and a preferential adsorber of nonpolar gases. The activated carbon granules 34 may be activated by pyrolization, carbonization, or chemical activation, such that the activated carbon maintains nonpolar properties.
2. As mentioned earlier, the metallic gas catalyst 28 in the area 14d provides the metallic catalyst surface 28a for catalyzing oxidation reactions of polar gases, including oxidation of aldehydes into other molecules, including carbon dioxide.

During operation an evacuated surgical smoke stream traverses the metallic catalyst surface 28a and traverses the metallic gas catalyst 28 in a substantially serial manner. The inventor has found the specific order of filtration and decontamination to be important because mechanical filtration must occur first, or the whole system 10 becomes contaminated with dust. Carbon filtration should occur second, removing most (nonpolar) VOCs and allowing for less competition for the catalyst.

In one illustrative embodiment, the carbon surface comprises a form of powdered, granular, fibrous, extruded, impregnated, coated, or woven carbon.

3. In one illustrative embodiment, a drying component, such as the optional desiccant or silica gel 26, may comprise calcium carbonate, calcium sulfate, calcium chloride, magnesium sulfate, coordination polymer, Zeolite, or molecular sieve to reduce polar competition from water vapor or humidity.
4. Alternatively, a condensation means such as a cooling coil, dehumidifier or thermoelectric plate can be utilized in addition to or in lieu of the optional desiccant or silica gel 26.
5. The surgical smoke treatment system 10 comprises the outer housing 12 and the inlets 16 and outlets 18 for connection to a smoke collection means or device, such as the air handling unit 40 (FIG. 6). The collection means or device may comprise at least one of a tubing system, vacuum system, electrocautery handpiece, funnel, gas separator, surgical port, surgical trocar, or surgical instrument.
6. In one illustrative embodiment, the metallic gas catalyst 28 comprises a catalyst surface 28a (FIG. 4) containing at least one of titanium, silver, palladium, platinum, manganese, iridium, rhodium, copper, zirconium, or other metallic element capable of catalyzing oxidation or mixed oxidation-reduction reactions of organic molecules. Moreover, the metallic gas catalyst 28 comprises a form of one or more honeycomb, foam, extrusion, plate, coating, granule, cylinder, sphere, bead, mesh, or similar to allow for adequate contact area with gas reactant.

Advantageously, the surgical smoke treatment system 10 provides a process and method for multiple stages for activating the gas catalyst by an internal activation mean comprising one or more of a heating means, photon-generating means, electron-generating means, or electromagnetic radiation means.

Advantageously, another embodiment of this invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A surgical smoke filtration system for receiving and treating vapor comprising:
   a filter;
   an activated carbon surface for adsorption of primarily nonpolar gases; and
   a metallic gas catalyst for oxidation of primarily polar volatile gases;
   wherein said filter, said activated carbon surface, and said metallic gas catalyst define an integrated filtration module; and
   said integrated filtration module further comprises a connector or connection means to attach said filtration system and an output or output means to allow for expulsion of treated surgical smoke;
   wherein said surgical smoke filtration system comprises a cauterizing system for cauterizing a surgical site associate with a patient, said surgical smoke filtration system comprising:
   a tubular body having a passageway for evacuating vapor from the surgical site;
   said tubular body comprising an extension for cauterizing at the surgical site; said extension being conductive and adapted to be coupled to a power source for energizing said extension;
   said tubular body having an inlet end having said extension and an outlet end coupled to a vacuum source adapted to create a predetermined pressure in said passageway in order to evacuate vapor from said surgical site through said tubular body prior to, during or after use of said surgical smoke filtration system at the surgical site, said vapor comprising at least one of smoke, cauterizing vapor, gas, liquid or debris; and
   wherein said passageway is defined by said tubular body and causes said vapor resulting from the cauterizing at the surgical site to be evacuated through said tubular body;
   wherein an elongated portion of said extension comprises a first surface and a generally opposing second surface, said first surface defining a working surface having a generally curved or arcuate portion.

2. The surgical smoke filtration system as recited in claim 1, wherein said activated carbon is substantially nonpolar and a preferential adsorber of nonpolar gases;
   said activated carbon being activated by pyrolization, carbonization, or chemical activation, such that said activated carbon maintains nonpolar properties.

3. The surgical smoke filtration system as recited in claim 1 wherein said catalyst comprises a metallic substrate for catalyzing oxidation reactions of polar gases, including oxidation of aldehydes into other molecules, including carbon dioxide.

4. The surgical smoke filtration system as recited in claim 1 wherein an evacuated surgical smoke stream traverses said activated carbon surface and thence traverses said metallic gas catalyst in a substantially serial manner.

5. The surgical smoke filtration system as recited in claim 1 wherein said activated carbon surface comprises a form of powdered, granular, fibrous, extruded, impregnated, coated, or woven carbon.

6. The surgical smoke filtration system as recited in claim 1 wherein said activated carbon surface comprises a drying component, including at least one desiccant comprising at least one of a silica gel, calcium carbonate, calcium sulfate, calcium chloride, magnesium sulfate, coordination polymer, Zeolite, or molecular sieve to reduce polar competition from water vapor or humidity;
   wherein a condensation means including cooling coil, dehumidifier or thermoelectric plate can be utilized in addition to or in lieu of desiccant.

7. The surgical smoke filtration system as recited in claim 1 wherein said filter comprises an outer housing with at least one connection to a surgical smoke collection means;
   said surgical smoke collection means comprising at least one of a tubing system, vacuum system, electrocautery hand piece, funnel, gas separator, surgical port, surgical trocar, or surgical instrument.

8. The surgical smoke filtration system as recited in claim 1 wherein said metallic gas catalyst comprises a catalyst surface containing at least one of titanium, silver, palladium, platinum, manganese, iridium, rhodium, copper, zirconium, or other metallic element capable of catalyzing oxidation or mixed oxidation-reduction reactions of organic molecules.

9. The surgical smoke filtration system as recited in claim 8 wherein said metallic gas catalyst and/or a catalyst substrate comprises a form of one or more honeycomb, foam, extrusion, plate, coating, granule, cylinder, sphere, bead or mesh, to allow for adequate contact area with gas reactant.

10. The surgical smoke filtration system as recited in claim 1 comprising an internal activation means for activating said gas catalyst;
    said internal activation means comprising one or more of heating means, photon-generating means, electron-generating means, or electromagnetic radiation means.

11. The surgical smoke filtration system as recited in claim 9 wherein said activation means is located within a substantially enclosed housing of a filter cartridge;
    said filter cartridge further comprising a transit means for connecting said cartridge to an external power source for powering of said activation means.

12. The surgical smoke filtration system as recited in claim 1 wherein said tubular body is conductive and creates a conductive path for current to flow from a power source to said extension.

13. The surgical smoke filtration system as recited in claim 1 wherein said extension is integral with said tubular body and both are conductive.

14. The surgical smoke filtration system as recited in claim 1 wherein said tubular body is defined by a wall having at least one predetermined dimension, said wall defining said passageway and said extension.

15. The surgical smoke filtration system as recited in claim 14 wherein said extension comprising a cross-sectional dimension that is smaller than said at least one predetermined dimension.

16. The surgical smoke filtration system as recited in claim 1 wherein said second surface has a radius of curvature substantially approximating a radius of curvature of said first surface.

17. The surgical smoke filtration system as recited in claim 1 wherein said extension is detachably secured to said tubular body with a predetermined connection, said tubular body and said extension both being conductive to permit said extension to cauterize at said surgical site.

18. The surgical smoke filtration system as recited in claim 17 wherein said predetermined connection is a least one of a threaded, press-fit, bayonet, or socket connection.

19. The surgical smoke filtration system as recited in claim 1 wherein said passageway is substantially centrally located in said tubular body to define a substantially linear or non-serpentine conduit for evacuating said vapor.

20. A surgical smoke filtration system for receiving and treating vapor, comprising:
 a filter;
 an activated carbon surface for adsorption of primarily nonpolar gases, and
 a metallic gas catalyst for oxidation of primarily polar volatile gases;
 wherein said filter, said activated carbon surface, and said metallic gas catalyst define an integrated filtration module; and
 said integrated filtration module further comprises a connector or connection means to attach said filtration system and an output or output means to allow for expulsion of treated surgical smoke;
 wherein said surgical smoke filtration system comprises a cauterizing system for cauterizing a surgical site associated a patient, said surgical smoke filtration system comprising:
 a tubular body having a passageway for evacuating vapor from the surgical site;
 said tubular body comprising an extension for cauterizing at the surgical site; said extension being conductive and adapted to be coupled to a power source for energizing said extension;
 said tubular body having an inlet end having said extension and an outlet end coupled to a vacuum source adapted to create a predetermined pressure in said passageway in order to evacuate vapor from said surgical site through said tubular body prior to, during or after use of said surgical smoke filtration system at the surgical site, said vapor comprising at least one of smoke, cauterizing vapor, gas, liquid or debris; and
 wherein said passageway is defined by said tubular body and causes said vapor resulting from the cauterizing at the surgical site to be evacuated through said tubular body;
 wherein said tubular body comprises an interior wall that defines said passageway, at least a portion of said interior wall having a catalyst coating.

21. An electrocautery and filtration system for cauterizing a surgical site associated with a patient and for treating vapor resulting therefrom electrocautery and filtration system comprising:
 an electrocautery instrument that generates the vapor during a surgical procedure; and
 a surgical smoke treatment system for receiving and treating said vapor, comprising:
 a filter;
 an activated carbon surface for adsorption of primarily nonpolar gases; and
 a metallic gas catalyst for oxidation of primarily polar volatile gases;
 wherein said filter, said activated carbon surface, and said metallic gas catalyst define an integrated filtration module;
 said integrated filtration module further comprises a connector or connection means to attach said electrocautery instrument and an output or output means to allow for expulsion of treated surgical smoke;
 wherein a passageway in said electrocautery instrument is defined by a tubular body and causes said vapor resulting from the cauterizing at the surgical site to be evacuated through said tubular body;
 wherein said cautery instrument comprises a cauterizing system for cauterizing a surgical site associated with a patient, said surgical smoke treatment system comprising:
 said tubular body having a passageway for evacuating vapor from the surgical site;
 said tubular body comprising an extension for cauterizing at the surgical site; said extension being conductive and adapted to be coupled to a power source for energizing said extension;
 said tubular body having an inlet end having said extension and an outlet end coupled to a vacuum source adapted to create a predetermined pressure in said in order to evacuate vapor from said surgical site through said tubular body prior to, during or after use of said surgical smoke treatment system at the surgical site, said vapor comprising at least one of smoke, cauterizing vapor, gas, liquid or debris, and
 wherein said passageway is defined by said tubular body and causes said vapor resulting from the cauterizing at the surgical site to be evacuated through said tubular body;
 wherein an elongated portion of said extension comprises a first surface and a generally opposing second surface, said first surface defining a working surface having a generally curved or arcuate portion.

22. The electrocautery and filtration system as recited in claim 21 wherein said activated carbon is substantially nonpolar and a preferential adsorber of nonpolar gases;
 said activated carbon being activated by pyrolization, carbonization, or chemical activation, such that said activated carbon maintains nonpolar properties.

23. The electrocautery and filtration system as recited in claim 21 wherein said catalyst comprises a metallic substrate for catalyzing oxidation reactions of polar gases, including oxidation of aldehydes into other molecules, including carbon dioxide.

24. The electrocautery and filtration system as recited in claim 21 wherein an evacuated surgical smoke stream traverses said activated carbon surface and thence traverses said metallic gas catalyst in a substantially serial manner.

25. The electrocautery and filtration system as recited in claim 21 wherein said activated carbon surface comprises a form of powdered, granular, fibrous, extruded, impregnated, coated, or woven carbon.

26. The electrocautery and filtration system as recited in claim 25 wherein said activated carbon surface comprises a drying component, including at least one desiccant comprising at least one of a silica gel, calcium carbonate, calcium sulfate, calcium chloride, magnesium sulfate, coordination polymer, Zeolite, or molecular sieve to reduce polar competition from water vapor or humidity;

wherein a condensation means including cooling coil, dehumidifier or thermoelectric plate can be utilized in addition to or in lieu of desiccant.

27. The electrocautery and filtration system as recited in claim 21 wherein said filter comprises an outer housing with at least one connection to a surgical smoke collection means; said surgical smoke collection means comprising at least one of a tubing system, vacuum system, electrocautery hand piece, funnel, gas separator, surgical port, surgical trocar, or surgical instrument.

28. The electrocautery and filtration system as recited in claim 21 wherein said metallic gas catalyst comprises a catalyst surface containing at least one of titanium, silver, palladium, platinum, manganese, iridium, rhodium, copper, zirconium, or other metallic element capable of catalyzing oxidation or mixed oxidation-reduction reactions of organic molecules.

29. The electrocautery and filtration system as recited in claim 28 wherein said metallic gas catalyst and/or a catalyst substrate comprises a form of one or more honeycomb, foam, extrusion, plate, coating, granule, cylinder, sphere, bead or mesh to allow for adequate contact area with gas reactant.

30. The electrocautery and filtration system as recited in claim 21 comprising an internal activation means for activating said gas catalyst; said internal activation means comprising one or more of heating means, photon-generating means, electron-generating means, or electromagnetic radiation means.

31. The electrocautery and filtration system activation means as recited in claim 29 wherein said activation means is located within a substantially enclosed housing of a filter cartridge; said filter cartridge further comprising a transit means for connecting said cartridge to an external power source for powering of said activation means.

32. The electrocautery and filtration system as recited in claim 21 wherein said tubular body is conductive and creates a conductive path for current to flow from a power source to said extension.

33. The electrocautery and filtration system as recited in claim 21 wherein said extension is integral with said tubular body and both are conductive.

34. The electrocautery and filtration system as recited in claim 21 wherein said tubular body is defined by a wall having at least one predetermined dimension, said wall defining said passageway and said extension.

35. The electrocautery and filtration system as recited in claim 34 wherein said extension comprising a cross-sectional dimension that is smaller than said at least one predetermined dimension.

36. The electrocautery and filtration system as recited in claim 21 wherein said working second surface has a radius of curvature substantially approximating a radius of curvature of said first surface.

37. The electrocautery and filtration system as recited in claim 21 wherein said extension is detachably secured to said tubular body with a predetermined connection, said tubular body and said extension both being conductive to permit said extension to cauterize at said surgical site.

38. The electrocautery and filtration system as recited in claim 37 wherein said predetermined connection is a least one of a threaded, press-fit, bayonet, or socket connection.

39. The electrocautery and filtration system as recited in claim 21 wherein said passageway is substantially centrally located in said tubular body to define a substantially linear or non-serpentine conduit for evacuating said vapor.

40. An electrocautery and filtration system for cauterizing a surgical site associated with a patient and for treating vapor resulting therefrom, said electrocautery and filtra n system comprising:
an electrocautery instrument that generates the vapor during a surgical procedure; and
a surgical smoke treatment system for receiving and treating said vapor, comprising:
a filter;
an activated carbon surface for adsorption of primarily nonpolar gases; and
a metallic gas catalyst for oxidation of primarily polar volatile gases;
wherein said filter, said activated carbon surface, and said metallic gas catalyst define an integrated filtration module;
said integrated filtration module further comprises a connector or connection means to attach said electrocautery instrument and an output or output means to allow for expulsion of treated surgical smoke;
wherein a passageway in said electrocautery instrument is defined by a tubular body and causes said vapor resulting from the cauterizing at the surgical site to be evacuated through said tubular body;
wherein said cautery instrument comprises a cauterizing system for cauterizing a surgical site associated with a patient, said surgical smoke treatment system comprising:
said tubular body having a passageway for evacuating vapor from the surgical site;
said tubular body comprising an extension for cauterizing at the surgical site; said extension being conductive and adapted to be coupled to a power source for energizing said extension;
said tubular body having an inlet end having said extension and an outlet end coupled to a vacuum source adapted to create a predetermined pressure in said passageway in order to evacuate vapor from said surgical site through said tubular body prior to, during or after use of said surgical smoke treatment system at the surgical site, said vapor comprising at least one of smoke, cauterizing vapor, gas, liquid or debris; and
wherein said passageway is defined by said tubular body and causes said vapor resulting from the cauterizing at the surgical site to be evacuated through said tubular body;
wherein said tubular body comprises an interior wall that defines said passageway, at least a portion of said interior wall having a catalyst coating.

41. An electrocautery system for cauterizing a surgical site associated with a patient, said electrocautery system comprising:
a tubular body having a passageway for evacuating vapor from the surgical site;
said tubular body comprising an extension for cauterizing at the surgical site; said extension being conductive and adapted to be coupled to a power source for energizing said extension;
said tubular body having an inlet end having said extension and an outlet end coupled to a vacuum source adapted to create a predetermined pressure in said passageway in order to evacuate vapor from said surgical site through said tubular body prior to, during or after use of said electrocautery system at the surgical site, said vapor comprising at least one of smoke, cauterizing vapor, gas, liquid or debris;

wherein said passageway is defined by said tubular body and causes said vapor resulting from the cauterizing at the surgical site to be evacuated through said tubular body; and a surgical smoke treatment system for receiving evacuated vapor and for treating it, said surgical smoke treatment system comprising:

a mechanical filter;

an activated carbon surface for adsorption of primarily nonpolar gases; and a metallic gas catalyst for oxidation of primarily polar volatile gases;

wherein said mechanical filter, activated carbon surface, and metallic gas catalyst define an integrated filtration module;

said integrated filtration module further comprises a connector or connection means to attach to said electrocautery system and an output or output means to allow for expulsion of treated surgical vapor;

wherein said extension is integral with said tubular body and both are conductive;

wherein said tubular body is defined by a wall having at least one predetermined dimension, said wall defining said passageway and said extension;

wherein an elongated portion of said extension comprises a first surface and a generally opposing second surface, said first surface defining a working surface having a generally curved or arcuate portion.

42. The electrocautery system as recited in claim 41 wherein said tubular body is conductive and creates a conductive path for current to flow from a power source to said extension.

43. The electrocautery system as recited in claim 41 wherein said extension comprising a cross-sectional dimension that is smaller than said at least one predetermined dimension.

44. The electrocautery system as recited in claim 41 wherein said second surface has a radius of curvature substantially approximating a radius of curvature of first surface.

45. The electrocautery system as recited in claim 42 wherein said extension is detachably secured to said tubular body with a predetermined connection, said tubular body and said extension both being conductive to permit said extension to cauterize at said surgical site.

46. The electrocautery system as recited in claim 45 wherein said predetermined connection is at least one of a threaded, press-fit, bayonet, or socket connection.

47. The electrocautery system as recited in claim 41 wherein said passageway is substantially centrally located in said tubular body to define a substantially linear or non-serpentine conduit for evacuating said vapor.

48. The electrocautery system as recited in claim 41 wherein said activated carbon surface is substantially nonpolar and a preferential adsorber of nonpolar gases;

said activated carbon surface being activated by pyrolization, carbonization, or chemical activation, such that said activated carbon surface maintains nonpolar properties.

49. The electrocautery system as recited in claim 41 wherein said metallic gas catalyst comprises a metallic substrate for catalyzing oxidation reactions of polar gases, including oxidation of aldehydes into other molecules, including carbon dioxide.

50. The electrocautery system as recited in claim 41 wherein an evacuated surgical smoke stream traverses said activated carbon surface and thence traverses said metallic gas catalyst in a substantially serial manner.

51. The electrocautery system as recited in claim 41 wherein the activated carbon surface comprises a form of powdered, granular, fibrous, extruded, impregnated, coated, or woven carbon.

52. The electrocautery system as recited in claim 51 wherein said activated carbon surface comprises a drying component, including at least one desiccant comprising at least one of a silica gel, calcium carbonate, calcium sulfate, calcium chloride, magnesium sulfate, coordination polymer, Zeolite, or molecular sieve to reduce polar competition from water vapor or humidity;

wherein a condensation means including cooling coil, dehumidifier or thermoelectric plate can be utilized in addition to or in lieu of desiccant.

53. The electrocautery system as recited in claim 41 wherein said mechanical filter comprises an outer housing with at least one connection to a surgical smoke collection means;

said surgical smoke collection means comprising at least one of a tubing system, vacuum system, electrocautery hand piece, funnel, gas separator, surgical port, surgical trocar, or surgical instrument.

54. The electrocautery system as recited in claim 41 wherein said metallic gas catalyst comprises a catalyst surface containing at least one of titanium, silver, palladium, platinum, manganese, iridium, rhodium, copper, zirconium, or other metallic element capable of catalyzing oxidation or mixed oxidation-reduction reactions of organic molecules.

55. The electrocautery system as recited in claim 49 wherein said metallic gas catalyst and/or said metallic substrate comprises a form of one or more honeycomb, foam, extrusion, plate, coating, granule, cylinder, sphere, bead or mesh to allow for adequate contact area with gas reactant.

56. The electrocautery system as recited in claim 41 comprising an internal activation means for activating said metallic gas catalyst;

said internal activation means comprising one or more of heating means, photon-generating means, electron-generating means, or electromagnetic radiation means.

57. The electrocautery system as recited in claim 56 wherein said internal activation means is located within a substantially enclosed housing of a filter cartridge;

said filter cartridge further comprising a transit means for connecting said filter cartridge to an external power source for powering of said internal activation means.

58. An electrocautery system for cauterizing a surgical site associated with a patient, said electrocautery system comprising:

a tubular body having a passageway for evacuating vapor from the surgical site;

said tubular body comprising an extension for cauterizing at the surgical site; said extension being conductive and adapted to be coupled to a power source for energizing said extension;

said tubular body having an inlet end having said extension and an outlet end coupled to a vacuum source adapted to create a predetermined pressure in said passageway in order to evacuate vapor from said surgical site through said tubular body prior to, during or after use of said electrocautery system at the surgical site, said vapor comprising at least one of smoke, cauterizing vapor, gas, liquid or debris;

wherein said passageway is defined by said tubular body and causes said vapor resulting from the cauterizing at the surgical site to be evacuated through said tubular body; and a surgical smoke treatment system for receiving evacuated vapor and for treating it, said surgical smoke treatment system comprising:
  a mechanical filter;
  an activated carbon surface for adsorption of primarily nonpolar gases; and
  a metallic gas catalyst for oxidation of primarily polar volatile gases;

wherein said mechanical filter, activated carbon surface, and metallic gas catalyst define an integrated filtration module;

said integrated filtration module further comprises a connector or connection means to attach to said electrocautery system and an output or output means to allow for expulsion of treated surgical vapor;

wherein said tubular body comprises an interior wall that defines said passageway, at least a portion of said interior wall having a catalyst coating.

* * * * *